April 25, 1961 G. C. BARNES 2,981,060
ROCKET CONSTRUCTION
Filed March 25, 1959

*INVENTOR*
*GILBERT C. BARNES*
BY Charles A. Warren
*ATTORNEY*

United States Patent Office 2,981,060
Patented Apr. 25, 1961

2,981,060
ROCKET CONSTRUCTION
Gilbert C. Barnes, Manchester, Conn., assignor to United Aircraft Corporation, East Hartford, Conn., a corporation of Delaware
Filed Mar. 25, 1959, Ser. No. 801,900
4 Claims. (Cl. 60—35.6)

This invention relates to an arrangement for varying the rate of combustion in a solid fuel rocket.

One feature of the invention is an arrangement by which to control the rate of combustion or decomposition in a solid fuel rocket during its flight without incapacitating the rocket, that is the rate of combustion may be reduced or stopped and then again started and increased to a maximum if desired during the rocket travel. Another feature is an arrangement by which the rate of combustion or the process of combustion itself may be under a control which may be located at a point remote from the rocket.

Other features and advantages will be apparent from the specification and claims, and from the accompanying drawings which illustrate an embodiment of the invention.

Figure 1:
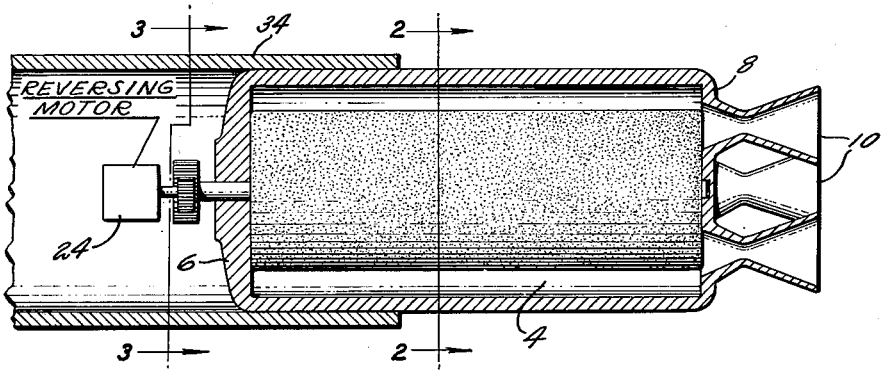
Fig. 1 is a longitudinal sectional view through a solid fuel rocket.

The arrangement is shown in a rocket which has a combustion chamber 4 having a closed forward end or cap 6 and a rearward end wall 8 with one or a plurality of thrust nozzles 10 therein. Within the chamber 4 are positioned two substantially semicircular blocks 12 and 14 of solid propellants. These blocks are made of or incorporate different propellants which are so selected that neither block alone will support combustion but the two blocks together if they are brought into close enough relation to each other will support combustion and the combustion rate will vary in accordance with the closeness of the two blocks to each other. For example, one of the blocks may consist primarly of fuel such as polyurethane in a binder and the other block may consist primarily of an oxidizer such as ammonium perchlorate in a binder. It will be understood that in most instances a suitable igniter of known construction might be incorporated to start the combustion process.

For the purpose of varying the spacing of the two blocks 12 and 14 of propellants each block may be mounted on a rod 16 or 18 which extends longitudinally through the respective blocks and substantially along the axis of the block. These rods are journalled in the end walls 6 and 8 of the rocket and the blocks are made to turn with the rods. The two rods extend through the upstream end wall 6 and may carry mating pinion gears 20 and 22 so that these blocks will be turned angularly in unison but in opposite directions. The gears 20 and 22 may be driven from a reversing motor 24 through a pinion 26 meshing with the gear 22. Suitable controls which may be incorporated within the vehicle in which the rocket is mounted may control the operation of the reversing motor or these controls may be responsive to a ground located device.

Figure 2:
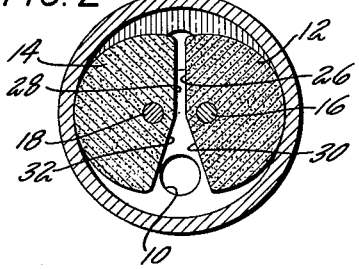
Fig. 2 is a transverse sectional view substantially on line 2—2 of Fig. 1.
Figure 3:
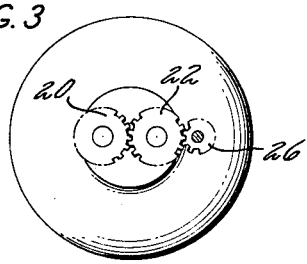
Fig. 3 is an end view with the driving shaft in section substantially on the line 3—3 of Fig. 1.

The contiguous surfaces 26 and 28 of the blocks 12 and 14, respectively, may be moved toward each other for more rapid combustion by turning the block 12 counterclockwise and the block 14 clockwise simultaneously or in fact by turning either of the blocks in the direction noted with the other block remaining stationary. Conversely, the rate of combustion may be decreased by moving the blocks in the opposite direction to those above-noted. As best shown in Fig. 2, the blocks 12 and 14 are preferably slightly less than hemispherical so as the surfaces 26 and 28 are moved apart to reduce the rate of combustion the other substantially radial surfaces 30 and 32 of the blocks will not be brought into close enough relation to initiate combustion in that area. The sleeve 34 represents the shell of a vehicle in which the rocket may be mounted and within which the control mechanism may be accommodated.

Figure 4:
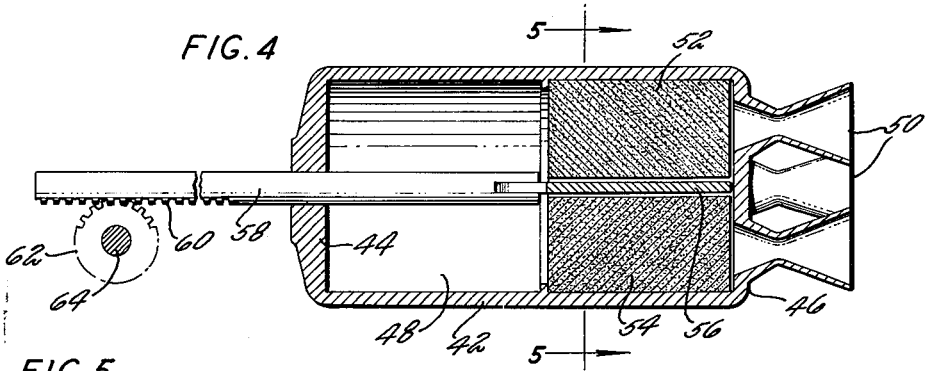
Fig. 4 is a sectional view similar to Fig. 1 showing a modification.
Figure 5:
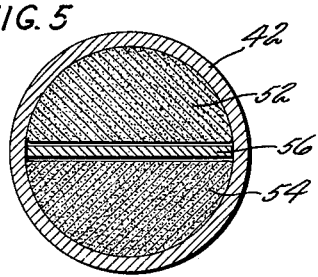
Fig. 5 is a transverse sectional view substantially on the line 5—5 of Fig. 4.

In the arrangement shown in Figs. 4 and 5, the rocket has a cylindrical wall 42 and end walls 44 and 46 defining therein the combustion chamber 48. The forward end wall 44 is substantially imperforate and the rearward end wall 46 has a plurality of thrust nozzles 50. Within the combustion chamber are two semicylindrical blocks 52 and 54 of solid propellants selected as above-described so that neither block will combust or decompose by itself although the two propellants when in close unshielded proximity will support combustion or may spontaneously ignite.

The rate of combustion in this arrangement is controlled by a shield 56 in the form of a plate located between the two blocks of propellant and axially movable to expose a greater or lesser area of the contiguous faces of the two blocks. Although the shield 56 may be moved axially by any suitable means one arrangement for accomplishing it is by attaching a rod 58 to the shield with the rod projecting through the head 44 of the combustion chamber. The rod may carry a rack 60 meshing with a pinion 62 carried by the shaft 64 of a reversing motor not shown. This motor would be similar in operation to the motor 24 of Fig. 1 and may be controlled by similar mechanisms.

It will be apparent that with the shield 56 in the position shown no combustion within the rocket chamber will take place. As the shield is withdrawn toward the left, portions of the face area of the blocks 52 and 54 are in effect brought into closer proximity, that is to say, unshielded proximity, so that combustion of the propellants in the two blocks will occur and continue. Obviously, the greater the area of the two propellants that are exposed by retraction of the shield, the more rapid will be the resulting combustion.

It is to be understood that the invention is not limited to the specific embodiment herein illustrated and described, but may be used in other ways without departure from its spirit as defined by the following claims.

I claim:

1. A solid fuel rocket including a combustion chamber, at least one thrust nozzle for said chamber, a plurality of solid propellants in said chamber, one of which alone will not support combustion but which together in close proximity will support combustion and means for varying the effective distance between the solid propellants.

2. A solid fuel rocket as in claim 1 in which each of the solid propellants is arranged as a separate block and the rate of combustion is varied by moving one of the blocks toward or away from the other block.

3. A solid fuel rocket as in claim 1 in which each of the solid propellants is arranged as a separate block and the rate of combustion is varied by retraction of a shield positioned between the blocks.

4. A solid fuel rocket as in claim 1 in which the solid propellants are arranged in separate blocks and the effective distance between the blocks is varied by a reversible motor.

References Cited in the file of this patent
UNITED STATES PATENTS
2,791,883    Moore et al. ------------ May 14, 1957